Dec. 12, 1950 V. J. SIGODA 2,533,292

MULTIPLE NEEDLE STITCHING MECHANISM

Filed Oct. 22, 1947 8 Sheets-Sheet 1

INVENTOR.
VICTOR U. SIGODA

BY Strauch & Hoffman

ATTORNEYS

Dec. 12, 1950 V. J. SIGODA 2,533,292

MULTIPLE NEEDLE STITCHING MECHANISM

Filed Oct. 22, 1947 8 Sheets-Sheet 2

INVENTOR.
VICTOR J. SIGODA

BY Strauch & Hoffman

ATTORNEYS

Dec. 12, 1950 V. J. SIGODA 2,533,292

MULTIPLE NEEDLE STITCHING MECHANISM

Filed Oct. 22, 1947 8 Sheets-Sheet 3

INVENTOR.
VICTOR J. SIGODA

BY Strauch & Hoffman

ATTORNEYS

MULTIPLE NEEDLE STITCHING MECHANISM

Filed Oct. 22, 1947 8 Sheets-Sheet 4

INVENTOR.
VICTOR J. SIGODA
BY Strauch & Hoffman
ATTORNEYS

Dec. 12, 1950 V. J. SIGODA 2,533,292

MULTIPLE NEEDLE STITCHING MECHANISM

Filed Oct. 22, 1947 8 Sheets-Sheet 5

INVENTOR.
VICTOR J. SIGODA

BY Strauch & Hoffman

ATTORNEYS

Dec. 12, 1950 V. J. SIGODA 2,533,292

MULTIPLE NEEDLE STITCHING MECHANISM

Filed Oct. 22, 1947 8 Sheets-Sheet 6

INVENTOR.
VICTOR J. SIGODA

BY Strauch & Hoffman

ATTORNEYS.

Dec. 12, 1950 V. J. SIGODA 2,533,292

MULTIPLE NEEDLE STITCHING MECHANISM

Filed Oct. 22, 1947 8 Sheets-Sheet 7

INVENTOR.
VICTOR J. SIGODA
BY Strauch & Hoffman
ATTORNEYS

Dec. 12, 1950 V. J. SIGODA 2,533,292

MULTIPLE NEEDLE STITCHING MECHANISM

Filed Oct. 22, 1947 8 Sheets-Sheet 8

INVENTOR.
VICTOR J. SIGODA

BY Strauch & Hoffman

ATTORNEYS

Patented Dec. 12, 1950

2,533,292

UNITED STATES PATENT OFFICE 2,533,292

MULTIPLE NEEDLE STITCHING MECHANISM

Victor J. Sigoda, Great Neck, N. Y., assignor to Man-Sew Corporation, New York, N. Y., a corporation of New York Application October 22, 1947, Serial No. 781,348

19 Claims. (Cl. 112—98)

This invention relates to multiple needle stitching mechanism, and has for its primary object and purpose to provide a novel mechanism of the type disclosed in Patent No. 2,369,183, issued February 13, 1945, whereby a wide variety of ornamental embroidery stitch designs may be accurately applied to a fabric material at high operating speeds.

One of the prominent objects of the invention resides in the provision of simple and reliably operating means mounted beneath the needle plate of the machine in cooperatively associated relation with a pair of spaced, vertically reciprocating hook needles for carrying the thread from stitches previously formed by the respective hook needles, in diagonally intersecting relation to each other and insuring the positive engagement of said threads in the needle hooks in the upward stroke of the latter through the fabric material. I thus eliminate the usual eye-pointed needles mounted on the machine arm above the needle plate for carrying the threads to the hook needles.

A more particular object of the invention resides in the provision of thread carrying fingers mounted at one of their ends below the needle plate for relative pivotal movement transversely of the line of feed of the material, and also for bodily arcuate movement longitudinally of the line of feed, whereby the respective threads are carried in diagonally crossed, intersecting relation from the previously formed threaded stitches, and engaged partly around the shanks of the respective hook needles in close contact therewith to thus insure the engagement of the threads in the needle hooks as the latter move upwardly through the material.

It is another object of the invention, in one embodiment thereof, to provide an additional hook needle and a thread carrying needle cooperating therewith, to form a saddle stitch superimposed upon and closely binding the diagonally intersecting thread stitches to the surface of the fabric.

A further object of the invention is to provide operating means for the thread carrying fingers and the feed mechanism of the machine, which readily lends itself, by the use of interchangeable cams and appropriate gear ratios, to the production of embroidery stitching of various selectively different designs.

It is also an object of my invention, particularly in the use of a large number of hook needles to form multiple rows of ornamental stitching, to provide individual guide nipples for each needle with adjustable tensioning means therefor for urging said nipple downwardly and holding the loop of the thread chain on the wrong side of the fabric as the thread is drawn upwardly by the hook needle through said loop.

Finally, my present improvements provide a very efficient and reliably operating machine of this class embodying a minimum number of elements of simple and rugged structural form, which may be rapidly and accurately assembled in proper cooperative relation, whereby desirable economies in production costs with reasonably low maintenance expense are realized.

With the above and other objects in view, the invention comprises the improved multiple needle stitching mechanism and the construction and relative arrangement of its several parts, as will hereinafter be more fully described, illustrated in the accompanying drawings, and subsequently incorporated in the subjoined claims.

In the drawings, wherein I have selected for illustration several simple and practical embodiments of the present invention, and in which similar reference characters designate corresponding parts throughout the several views.

Figures 12, 13, 14:
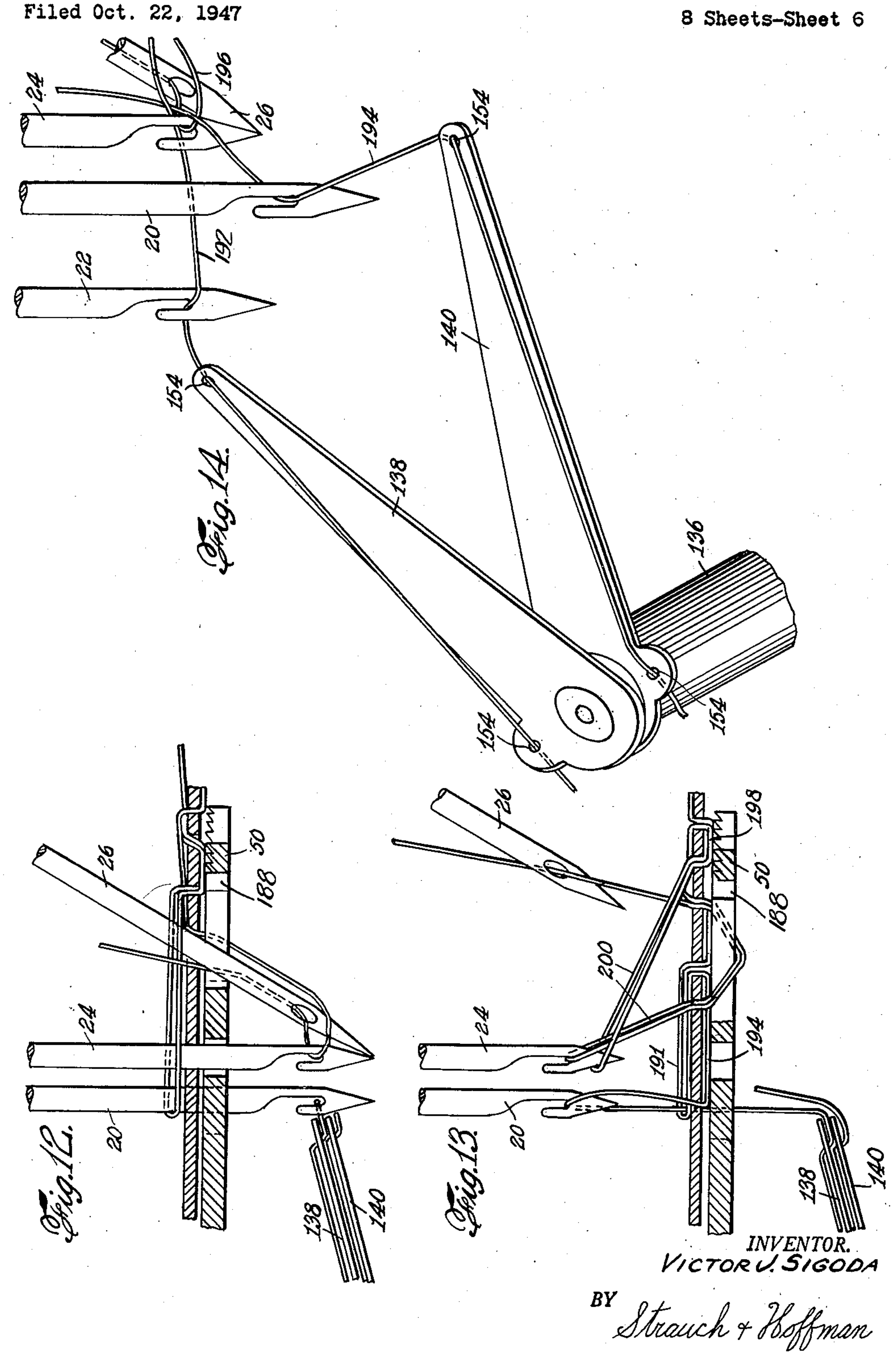
Figures 12 and 13 are detail vertical sectional views substantially on the line 12—12 of Figure 11 illustrating different positions of the needles below and above the needle plate, respectively, in the stitch forming cycle.
Figures 15, 15A, 16, 16A:
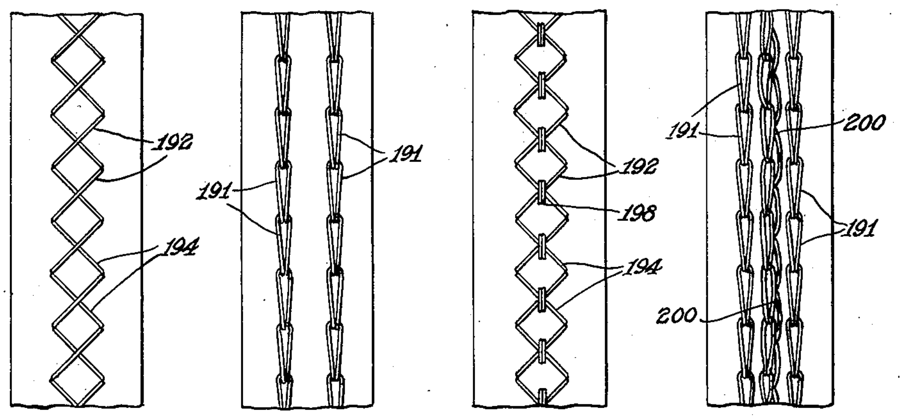
Figure 17:
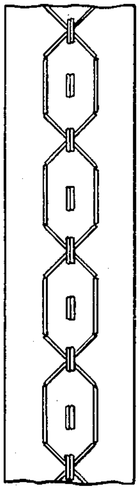
Figure 18:
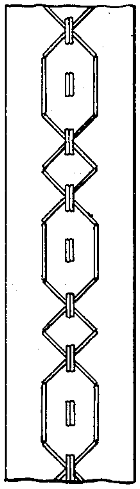
Figure 19:
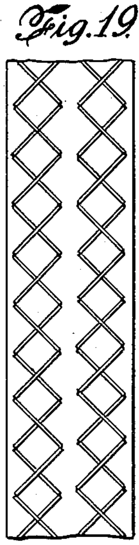
Figure 20:
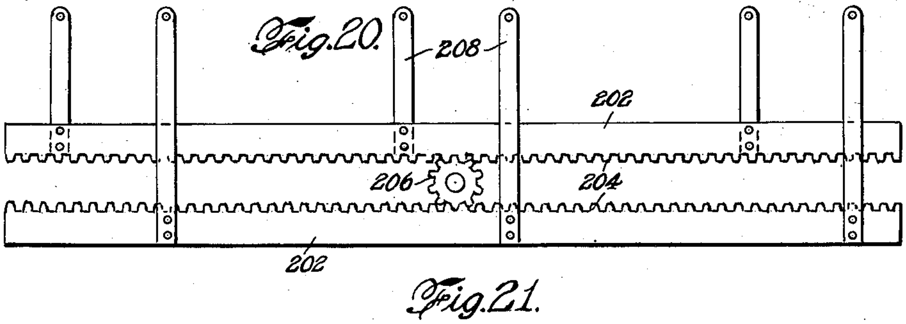
Figure 21:
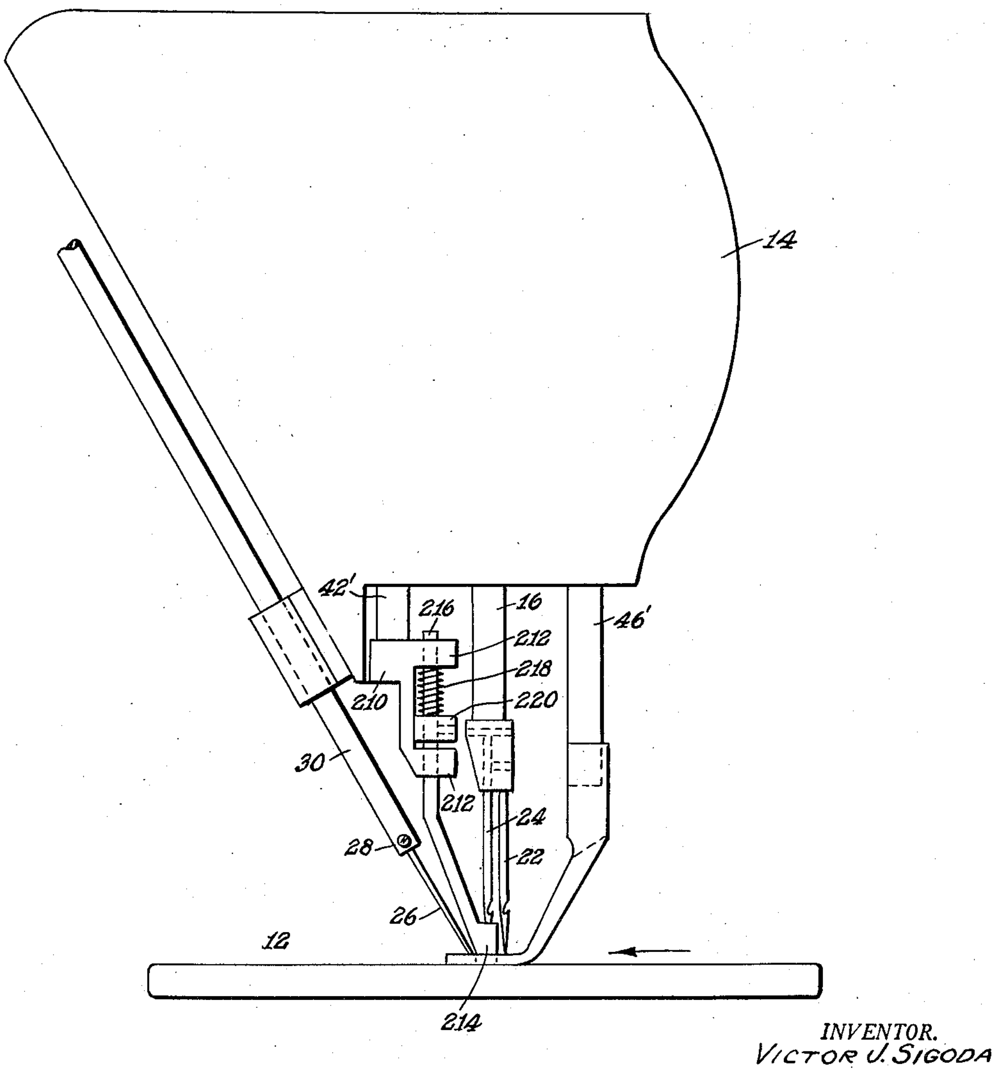

Figure 14 is a perspective view, illustrating the manner in which the threads are diagonally crossed in the movement of the thread carrying fingers, and respectively engaged in the hooks of the forward hook needles in the up-stroke thereof, and also showing the manner in which the saddle stitch is formed by the rear hook needle and the thread carrying needle to lock the diagonally intersecting threads to the fabric;

Figures 15 and 15A illustrate the right and wrong sides respectively of a piece of fabric having one ornamental stitch design applied thereto, comprising two superimposed, diagonally intersecting lines of zig-zag stitching, without the locking saddle stitch;

Figures 16 and 16A are similar views, in which the saddle stitch is applied to the zig-zag lines of stitching at the points of intersection;

Figures 17 and 18 illustrate other ornamental stitch designs, which may be formed by means of the present invention with the use of interchangeable cams and properly selected gear ratios;

Figure 19 illustrates a multiple row arrangement of the design shown in Figure 15, produced by duplication of the stitch forming mechanism;

Figure 20 is a plan view illustrating an alternative mounting and arrangement of the thread carrying fingers and operating means therefor, which may be employed in applying the multiple row stitch design of Figure 19; and Figure 21 is an end elevation illustrating a resiliently tensioned individual mounting of thread loop holding members guidably associated with each of the stitch forming hook needles.

In the embodiment of the invention illustrated in Figures 1 to 14 of the drawings, and by way of example, I have shown a part of the usual hollow arm 10 which extends horizontally above the machine bed 12, and at its forward end terminates in the head 14, in which the vertically reciprocating needle bar 16 is mounted in conventional manner and actuated by suitable connections (not shown) with the motor driven main shaft mounted in the arm 10. The needle holder 18 on the lower end of bar 16 is provided with suitable means for detachably securing therein a pair of hook needles 20 and 22, respectively, in transversely spaced apart alignment with respect to the line of feed of the fabric material over the bed plate 1. Rearwardly of the needles 20 and 22, a third hook needle 24 may be removably secured in the holder 18 and disposed in a vertical plane substantially midway between the hook needles 20 and 22.

With the hook needle 24, an eye-pointed thread carrying needle 26 is cooperatively associated, and is detachably secured in the holder 28 on the lower end of a needle bar 30, mounted to reciprocate in spaced guide bearings 32 on the rear vertically inclined side wall 34 of the head 14 of the machine arm. Thus the needle bar 30 is disposed at a vertically oblique inclination longitudinally of the line of feed of the material. As will be noted from reference to Figure 2 of the drawings, said needle bar is also disposed to reciprocate in a transversely inclined path with respect to the line of feed of the material. If desired, the needle bar 30 may be mounted in a suitable housing 36 secured to the rear inclined face 34 of head 14. A transverse shaft 38 mounted in the head 14 and geared to the main needle operating shaft as shown in Patent No. 2,369,183, is operatively connected with needle bar 30 by link 40 or other equivalent means to transmit reciprocating motion to said needle bar in timed relation with the reciprocating motion of the vertically disposed hook needle bar 16.

As also shown in said issued patent, a vertically movable rod 42 is mounted in the head 14, and at its lower end carries tubular guide nipples 44 for the hook needles 20, 22 and 24, which are urged downwardly by spring means to hold the thread chain loops upon the upper surface of the material during each interval of rest as the threads are drawn upwardly therethrough by the hook needles.

Figure 11:
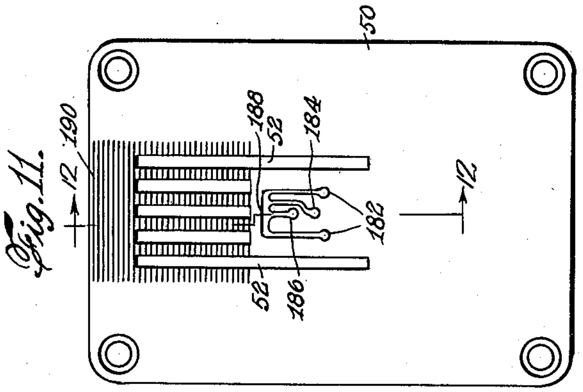
Figure 11 is a similar view of the needle or throat plate.
Figure 10:
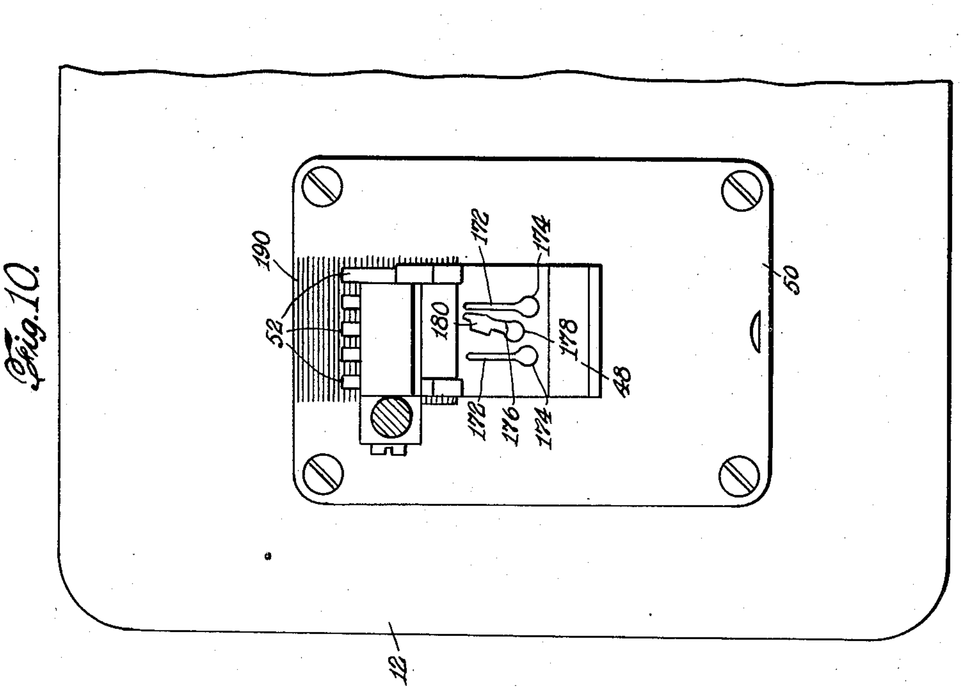
Figure 10 is a top plan view of the presser foot.

The usual presser foot bar 46 is mounted for vertical movement in the machine head 14 rearwardly of the needle bar 16, and is provided at its lower end with a special form of presser foot 48, shown in Figure 10, to contact the upper surface of the fabric material and hold the same closely upon the upper surface of the needle or throat plate 50 secured to the machine bed 1, in the zone of reciprocation of the stitch forming needles. This throat plate is also of special construction as shown in Figure 11, and is provided with the usual slots 52 therein to receive the toothed ribs of the four-motion feed dog, shown at 54 in Figure 1, which controls the intermittent feeding movement of the fabric material over said throat plate beneath the presser foot 48.

Figure 3:
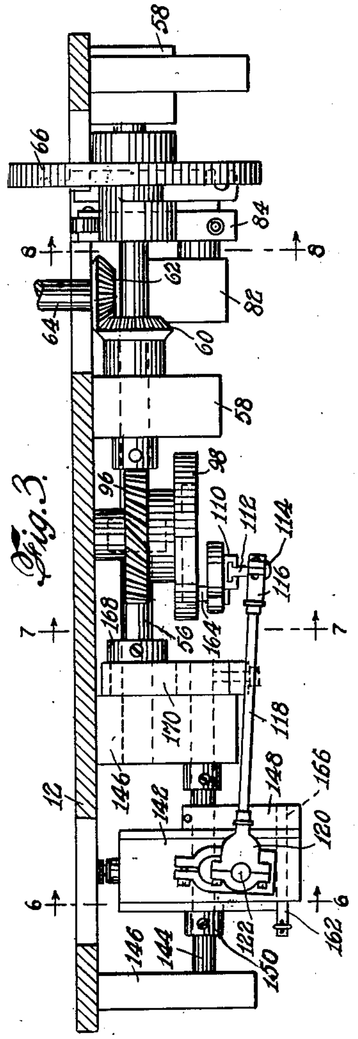
Figure 3 is a longitudinal sectional view through the machine bed, illustrating the mounting and arrangement of the actuating means for the thread carrying fingers below said bed.
Figure 4:
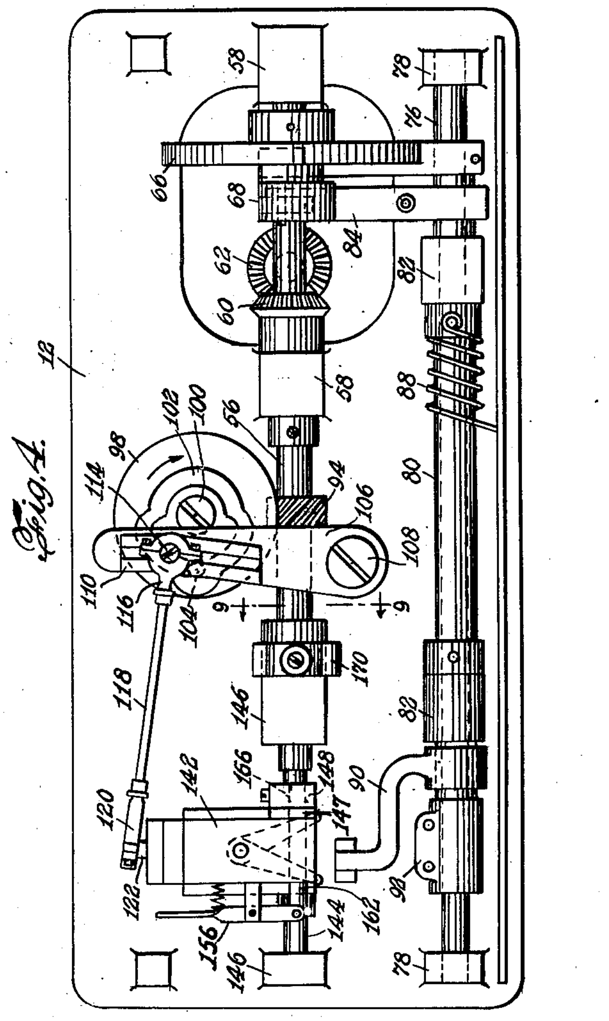
Figure 4 is a bottom plan view.

Referring now to Figures 3 and 4 of the drawings, a longitudially extending shaft 56 is journalled in spaced bearings 58 on the underside of the bed plate 12. As shown in the above mentioned patent, this shaft is driven by the constantly meshed bevel gears 60 and 62, the latter being fixed to the lower end of a vertical shaft 64, extending upwardly through the hollow supporting pedestal for the machine arm 10 at the rear end of the bed plate 12, and geared to the main needle operating shaft mounted in said arm.

At this end of the shaft 56, a pair of cam discs 66 and 68 are fixed thereto. The disc 66 is provided with a cam track 70 in one side thereof, receiving the follower roller 72 mounted on one end of an arm 74, which is suitably fixed at its other end to a rock shaft 76 mounted at its ends in bearings 78 on the bed plate 12. The intermediate portion of shaft 76 extends through a second tubular rock shaft 80, which is mounted in spaced bearings 82 on bed plate 12. An arm 84 fixed to one end of this rock shaft 80, carries follower roller 86 which is held in constant yielding contact with the periphery of cam 68 by the spring 88.

To the other end of tubular rock shaft 80, an arm 90 is fixed and connected with feed dog 54 to impart a vertical lifting motion thereto to contact the toothed ribs thereof with the fabric material. To the corresponding end of rock shaft 76, a member 92 is fixed and connected with the feed dog in conventional manner to impart horizontal motion to said dog, whereby the desired intermittent rectilinear feeding movement of the fabric material over the throat plate 50 will be obtained in the rotation of cams 66 and 68. It will of course be apparent that by the provision of interchangeable cam members of different forms, a feeding movement of the material of any desired predetermined length may be obtained.

The shaft 56 also carries a spiral gear 94, which is in constant mesh with a similar gear 96 on one side of a cam disk 98, mounted to rotate on stud shaft 100, suitably fixed to the bed plate 12. Disk 98 at the other side thereof is provided with cam track 102, in which is engaged a follower 104 carried by a horizontal arm 106, which is pivotally mounted at one of its ends on the fixed supporting stud 108 on bed plate 12. This arm is provided with a longitudinally extending, arcuately curved guideway 110 for a slidably adjustable block 112 fixed in adjusted position by the screw 114. This slide block carries a universally movable ball joint member 116 connected by the link rod 118 and a similar ball joint member 120 with an arm 122. This arm is fixed to one end of the shaft 124 journalled in a frame 126. A bevel gear 128 fixed to the other end of said shaft, meshes at diametrically opposite sides thereof with similar bevel gears 130 and 132, respectively. Gear 130 is fixed to shaft 134, which extends through a tubular shaft 136 to which the other gear 132 is fixed. To corresponding ends of these shafts 134 and 136, thread carrying fingers 138 and 140 respectively are fixed at one of their ends, and extended in parallel relation to each other at right angles to the shaft axes. It will of course be understood that in the operation of arm 122 and the gearing, shafts 134 and 136 will be rocked in opposite directions, and the fingers 138 and 140 will move across each other to alternately position said fingers at their free ends in cooperative relation with the respective hook needles 20 and 22.

It is obvious that in the rotation of shaft 56 in timed relation with the rotation of the needle operating shaft, cam 98 will impart a single motion through the above described connections to the arm 122 in one direction during a portion of one-half of each revolution of the cam, and a single motion in the opposite direction during a part of the other half of the cam revolution. As the ratio between gears 94 and 96 is 1:2, a single motion of arm 122 will therefore occur in either direction for each complete rotation of the gear 94. Since gear 94 bears a unity ratio with the rotation of the main shaft, and hence the needle stroke, such single motion of the arm 122 will occur once during each stitch forming cycle.

Figure 5:
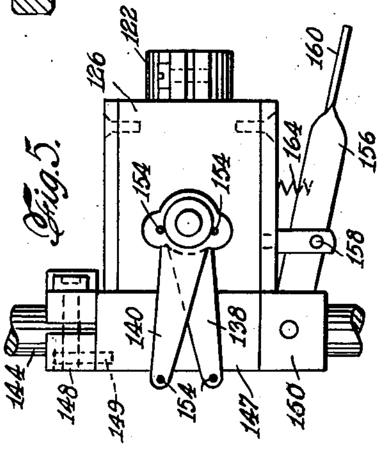
Figure 5 is a detail top plan view, illustrating the mounting of the actuating unit for the thread carrying fingers.
Figure 6:
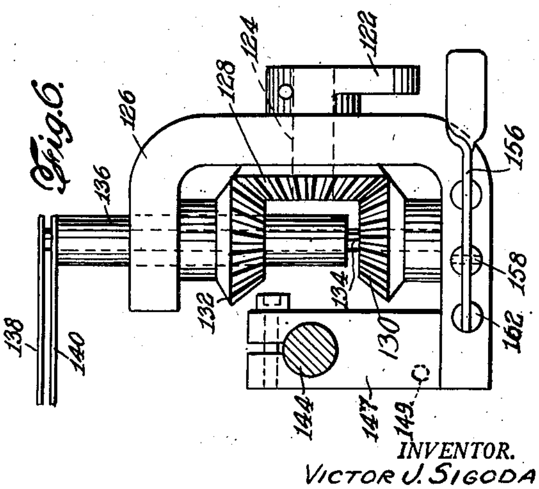
Figure 6 is a vertical section on an enlarged scale, taken substantially on the line 6—6 of Figure 3, the housing for the gearing being omitted.

Preferably, the frame 126 is enclosed in a housing 142 and supported by bar 147 for pivotal movement upon a shaft 144, which is journalled at its opposite ends for rocking motion in bearings 146 on bed plate 12, below and in axial parallelism with the shaft 56. As seen in Figure 5 of the drawings, axial shifting movement of housing 142 relative to shaft 144 is prevented by the upper end of bar 148 clamped or otherwise fixed to said shaft at one side of the housing, and the collar 150 fixed to said shaft at the opposite side of said housing.

Figure 1:
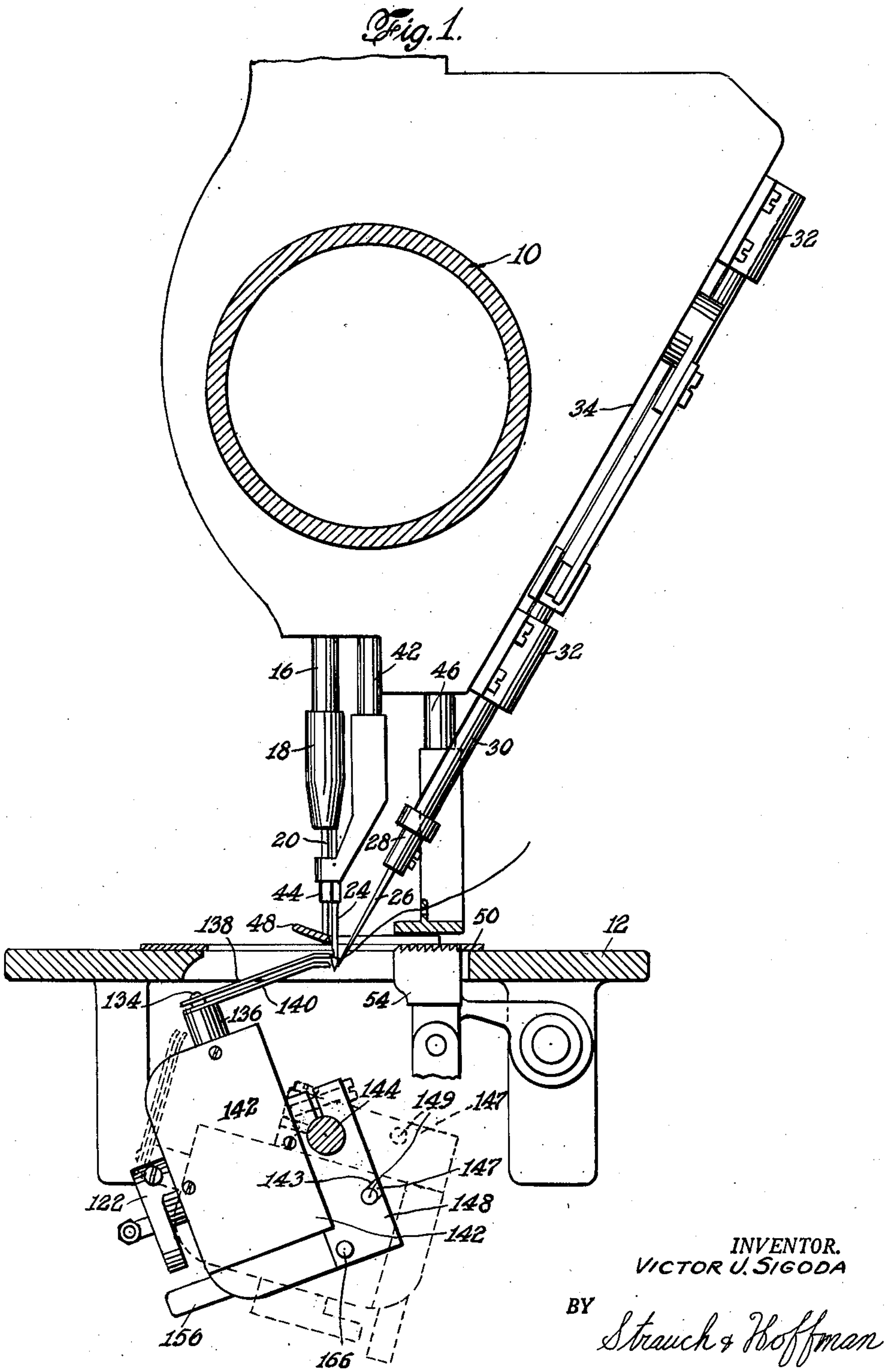
Figure 1 is an end elevation, the thread carrying fingers being shown in full lines in operative relation to the hook needles, and in dotted lines in inoperative position for the connection of the threads therewith.
Figure 2:
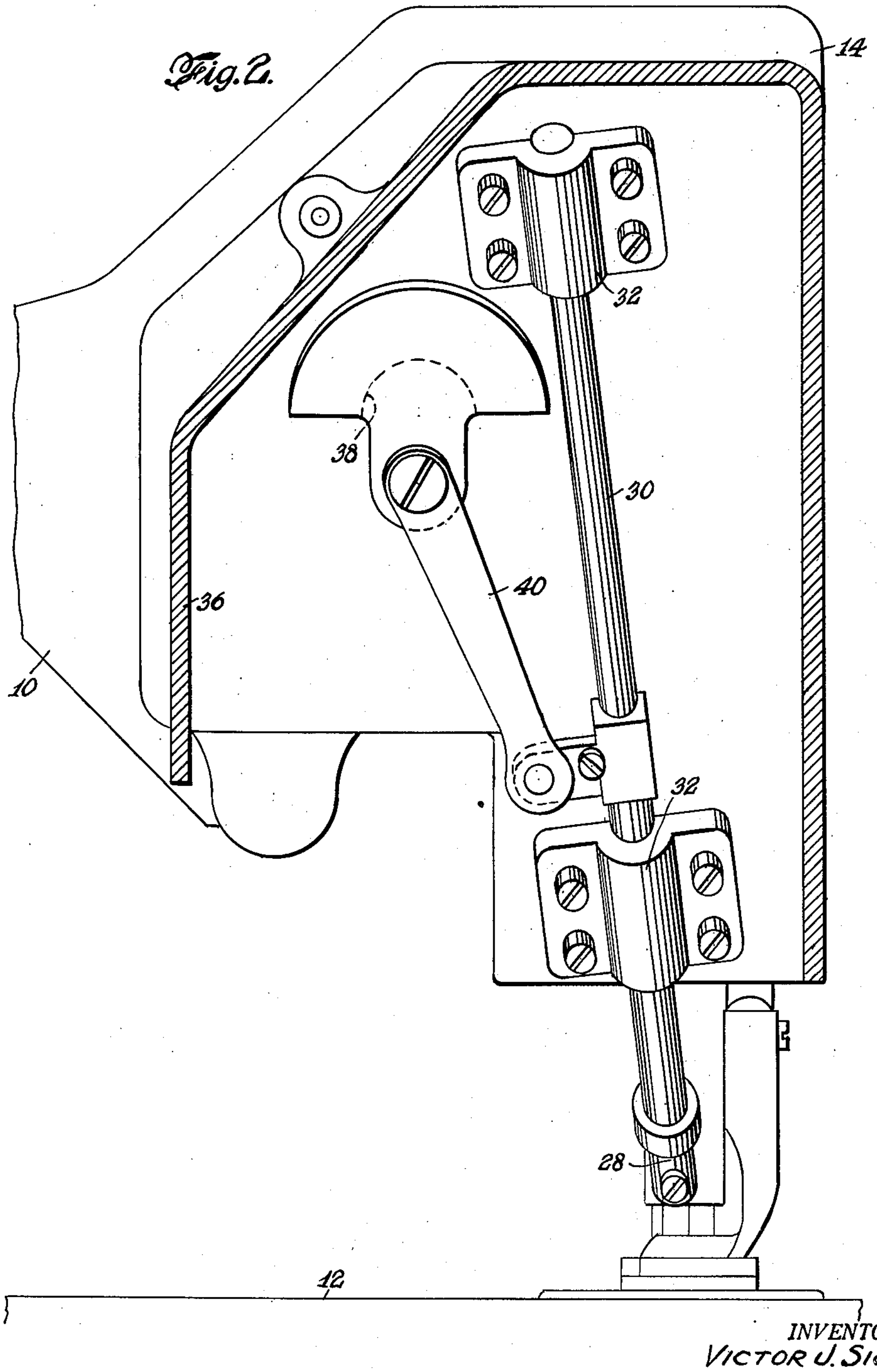
Figure 2 is a rear elevation showing the mounting of the obliquely inclined thread carrying needle on the machine arm and a part of the actuating means therefor.

Thus the housing 142 and frame 126, together with thread carrying fingers 138 and 140 and operating gearing therefore, may be pivotally rocked relative to shaft 144 from the position shown in full lines in Figure 1 of the drawings, to the dotted line position. As will be seen, the thread carrying fingers 138 and 140 are thus conveniently positioned for the easy and quick threading of the threads through the spaced openings 154 in each finger at the opposite ends thereof. Pivotal movement of the frame 126 and housing 142 to normal operative position is limited by the engagement of pin 149 fixed in bar 147 in a notch 143 in the edge of the fixed bar 148 on shaft 144.

Since, in the stitch forming cycle, the thread carrying fingers must oscillate with the shaft 144 to impart an arcuate movement to said fingers longitudinally of the line of feed of the work concurrently with their relative pivotal movement, suitable latch means is provided for releasably latching the operating unit for said fingers against pivotal motion relative to the shaft. For this purpose, in the present instance, I have shown a lever 156 pivotally mounted intermediate of its ends as at 158 upon one side wall of the housing 142 at the lower end thereof. One end of this lever is provided with a suitable finger piece 160, and at its other end is pivotally connected with an axially movable locking pin 162 mounted in the frame 126 and yieldingly urged by the spring 164 into an opening 166 in the lower end of bar 148 to the shaft 144.

Figure 9:
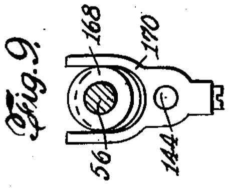
Figure 9 is a detail section taken substantially on the line 9—9 of Figure 4.
Figures 7, 8:
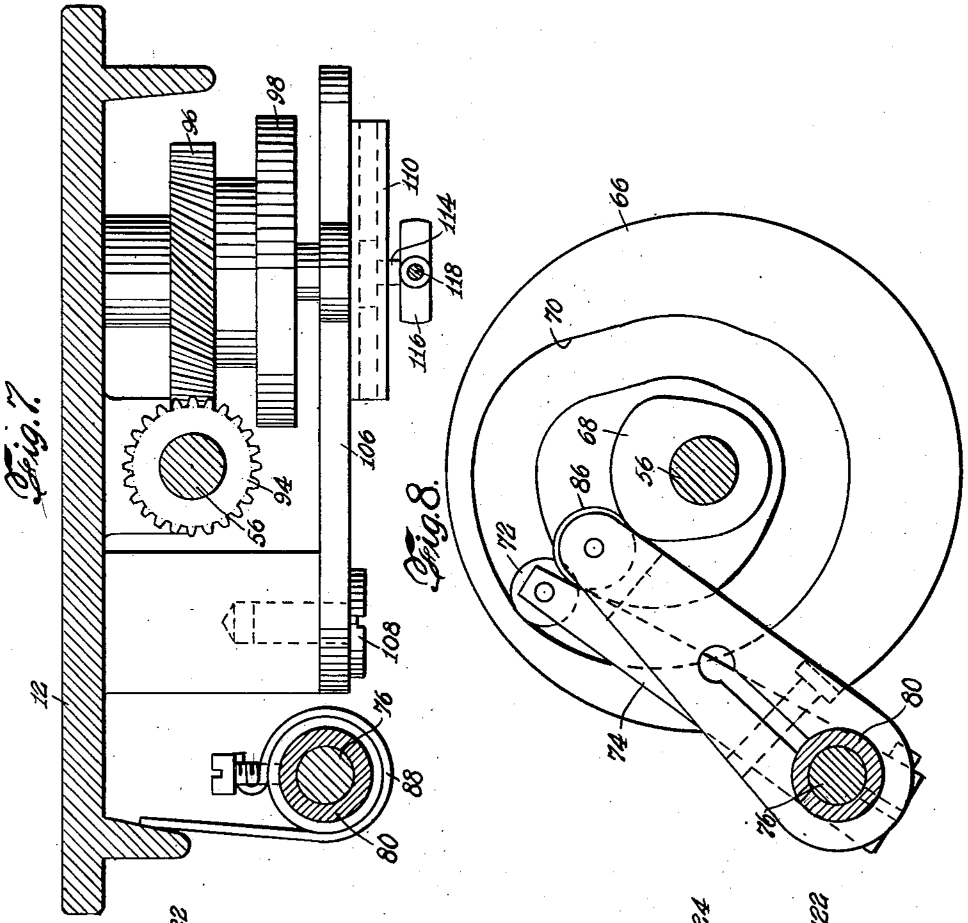
Figure 7 is a similar sectional view taken substantially on the line 7—7 of Figure 3.
Figure 8 is a vertical section on an enlarged scale taken on line 8—8 of Figure 3, illustrating the cam means controlling the vertical and horizontal motions of the four-motion feed dog.

Oscillating motion is transmitted to shaft 144 by an eccentric 168 fixed on the shaft 56 and coacting with the arms of a fork 170, fixed on the inner end of shaft 144, as most clearly seen in Figure 9 of the drawings. Thus it will be understood that from the common operating shaft 56, feed dog 54 is actuated by cams 66 and 68, relative pivotal movement is transmitted to thread carrying fingers 138 and 140 in opposite directions through cam 98, and eccentric 168 operates to rock shaft 144, and the operating unit for fingers 138 and 140, to move the latter in an arcuate path longitudinally of the work, such movements of the several instrumentalities occurring in properly timed relationship to each other.

As shown in Figure 10 of the drawings, the shoe of presser foot 48 is provided with spaced longitudinal slots 172, terminating at their forward ends in openings 174 which receive the guide nipples 44 for the forward hook needles 20 and 22 respectively. Between the slots 172 and angularly disposed relative thereto, there is a comparatively short slot 176 terminating at its forward end in the opening 178 rearwardly of opening 174 for the third hook needle 24. At its rear end, the slot 176 communicates with opening 180 which receives the obliquely inclined thread carrying needle 26.

The needle or throat plate 50, as shown in Figure 11, between the outer side slots 52 for the feed dog, is provided with needle receiving openings 182 corresponding to openings 174 in the presser foot, and the additional openings 184 and 186 corresponding to needle receiving openings 178 and 180 in the presser foot. Slots extend rearwardly or in the direction of feed from each of the needle receiving openings in the throat plate, and are connected at their rear ends by a common transverse slot 188, through which the threads are drawn upwardly through the work in the stitch forming operation. If desired, the upper surface of the needle or throat plate 50 may be serrated as indicated at 190 beneath the rear end of the presser foot shoe, for the purpose of securely holding the work against shifting movement during the stitch forming cycle of operation, between intermittent feeding movements of the work.

When it is desired to produce the design shown in Figure 15 of the drawings, in which two lines of zig-zag stitching are applied to the fabric in superimposed relation, the rear hook needle 24 and the thread carrying needle 26 are removed. In the operation of the hook needles 20 and 22, after the needles have penetrated the work and the hooks thereof are disposed below the needle or throat plate, it is obvious that when a thread is presented to an individual needle, in the ascension or upward stroke of the needle it will be caught in the hook thereof and drawn upwardly through the surface of the work to form a loop. In the feeding movement of the work, this loop will be elongated along the surface thereof. As the hook needle descends to form the next stitch, it moves through said loop and the work, and again presents the hook for engagement with the thread below the needle plate. In the following return or upward stroke of the needle, the hook will engage the thread below the needle plate and draw the same upwardly through the work, and through the closed end of the loop of the preceding stitch on the upper surface of the work, thus causing the conventional chain stitch to be formed as shown at 191 in Figure 15A of the drawings.

Referring now to Figure 14 of the drawings, it will be noted that at the time the needle hooks are below the throat plate and in position to engage threads for the next stitch, the respective threads lie in diagonal lines extending from the respective stitches last formed by the hook needles across the inner sides of the respective needles to the thread carrying fingers 138 and 140 respectively. Thus the threads are in diagonally intersecting relation to each other between the last formed stitches and the hook needles. By proper timing of the relative movements of the hook needles and the thread carrying fingers, the stitch forming operations occur in the following sequence.

Assuming that stitches have been previously formed in the work by the needles 20 and 22, when said needles in the following stitch cycle have penetrated the work and moved below the needle or throat plate, the thread carrying fingers will have been pivotally moved across each other to diagonally position the threads from the last formed stitches at the inner sides of the respective needles as above explained, but will not yet have reached their point of widest separation. In such position of the thread carrying fingers, the operating unit therefor has been rocked forwardly by the eccentric 158, and the fingers positioned in maximum spaced relation away from the region of action of the needles. The threads are thereby held by the fingers in obliquely disposed intersecting relation below the needle plate under tension on lines running from the needle holes previously formed through the work to the ends of the respective fingers 138 and 140, each thread extending in contact with the inner side of the respective needle shanks.

After the hook needles have descended to their lowest position, and start their return movement, the free ends of the fingers 138 and 140 then move to the point of widest separation, while said fingers and the operating unit therefor are rocked with shaft 144 to cause an arcuate bodily movement of the fingers longitudinally of the line of feed and in the direction thereof, or rearwardly with respect to the needles 20 and 22. Thus the fingers 138 and 140 will move past the outer side of the respective hook needles so that the threads are actually wrapped about halfway around each needle shank above the hook, thus insuring positive engagement of the respective threads in the hooks of the needles as the latter move upwardly through the work. At the end of the arcuate movement of the fingers 138 and 140, their free ends begin moving downwardly relative to the needles, thus moving the threads along the needle shanks in reverse direction to the movement of the needles, and positively bringing the threads into the needle hooks as the latter ascend through the work. The thread carrying fingers and the operating unit therefor, remain in this position for a short interval while the threads are brought up through the work, said fingers being then reversely rocked away from the needle area and reaching the outermost position toward the front of the machine as the relative pivotal movement of the fingers 138 and 140 takes place to diagonally cross the threads under the throat plate, and position the same for engagement by the needle hooks in the following stitch forming operation. In this manner, the superimposed zig-zag stitch design of Figure 15 may be rapidly and accurately produced. The thread supply spools for the fingers 138 and 140 may be conveniently mounted in any desired manner below the bed plate 12.

When it is desired to lock the zig-zag stitch forming threads 192 and 194 respectively to the fabric at their points of intersection to form the design shown in Figure 16, the third hook needle 24 and the obliquely inclined thread carrying needle 26 are employed. The operation of the latter needle is properly timed to descend below the needle plate and present the saddle stitch forming thread 196 to the hook of the vertically reciprocating needle 24 as seen in Figure 14. The latter hook needle is positioned rearwardly of hook needles 20 and 22, and in closely contiguous relation to one side of the obliquely reciprocating thread carrying needle 26. Since the path of reciprocating motion of needle 26 is also inclined transversely of the line of feed of the material, the point thereof in the descending stroke of said needle, will safely pass the point of the hook needle 24 without interference. The eye of the thread carrying needle 26 in the descending stroke thereof, passes between the threads 192 and 194 as they are diagonally positioned by the operation of fingers 138 and 140, rearwardly of the point of intersection of said threads, which are substantially in rubbing contact with the opposite sides of the needle 26. The hook needle 24 descends between the crossed-over threads 192 and 194 in advance of their point of intersection, the relationship of the needles 24 and 26 being such that the hook of needle 24 descends through the loop of thread 196 carried by needle 26, and in the upward or return strokes of the needles 24 and 26, the two threads 192 and 194 are securely caught and held by the saddle stitch loop formed by needles 24 and 26, and positively locked at the point of intersection upon the surface of the fabric, as shown at 198 in Figure 16 of the drawings. In the intermittent feeding movement of the work, the saddle stitch loop is pulled upwardly through a previously formed stitch loop on the upper surface of the fabric to form the usual interlocking chain of saddle stitch loops shown at 200 in Figure 16A. As shown in Figures 12 and 13, in the upward movement of needles 24 and 26, loop 200 will be drawn upwardly beneath the tongue formed in throat plate 50 between the slots extending rearwardly from the needle openings 184 and 186, which acts to tension the thread loop (see Figure 11). In the feeding movement of the fabric the thread moves rearwardly through these slots and off of said tongue so that the loop is drawn upwardly through slot 188 in the final ascending movement of the needles into close binding contact with the intersecting threads on the under side of the fabric.

In Figures 17 and 18 of the drawings, I have illustrated several other ornamental stitch designs which may be produced by means of the present invention by the use of appropriately selected interchangeable cams and proper gear ratios, for effecting the operation of the several cooperating elements in a desired predetermined sequence.

The mounting and arrangement of the thread carrying fingers 138 and 140, and the operating unit therefor, may be modified in various ways to effect a diagonally intersecting or crossed relationship of the superimposed lines of zig-zag stitches. In Figure 20 of the drawings, I have illustrated one alternative of this feature of the present invention which is particularly designed to simultaneously produce in one operation, multiple rows of superimposed, intersecting zig-zag lines of stitching, as illustrated in Figure 19 of the drawings.

In the illustrated example of this alternative construction, a pair of parallel bars 202 are mounted in a suitable housing (not shown) for relative reciprocating motion transversely of the line of feed of the work, and are provided on their inner opposed longitudinal edges with rack teeth 204 in constant mesh with the opposite sides of an actuating gear 206. This gear may be operated by suitable motion transmitting connections with the cam 98 above described, or other equivalent means.

At longitudinally spaced points, a plurality of thread carrying fingers 208 are secured at one of their ends to each of the bars 202 and extend therefrom in the same direction and in parallel relation with each other. The adjacent spaced fingers 208 on the respective bars 202 cooperate in the relative movement of said bars in opposite directions to diagonally cross the threads carried by the respective fingers, in the same manner as in the construction first described. Also, the housing for the assembly of Figure 20 may be mounted beneath the bed plate in the same manner as shown in Figure 1, and oscillated or rocked as above described to move the thread carrying fingers on the respective bars 202 longitudinally of the line of feed concurrently with their relative movements transversely thereof.

Of course, in the use of this embodiment a multiple arrangement of the vertically reciprocating hook needles 20 and 22 are employed. In the use of a large number of the hook needles, the arrangement of the thread loop and work holding nipples 44 urged downwardly upon the work by a single spring acting on the rod 42, is not entirely satisfactory, due to inequalities in the work and nonuniform action of the nipple members thereon. I therefore prefer to provide the individual mounting of the nipple members as shown in Figure 21 of the drawings. Of course, a modified type of presser foot and needle or throat plate will also be necessary, and in this case, I prefer to mount the presser foot bar 46' in the front side of the machine head 14, the work being fed beneath the presser foot from right to left, as indicated by the arrow. The nipple carrying bar 42' has a guide bracket 210 fixed to the lower end thereof provided with vertically spaced parts 212 having aligned openings therein in sufficient number to receive the cylindrical shank portions 216 of the required number of nipple members 214. A spring 218 surrounds the shank 216 of each of the nipple members, and bears at its upper end against the upper end part 212 of bracket 210, the lower end of the spring bearing against the adjustable collar 220 on said shank, whereby the tension of the spring 218 may be regulated. Thus, it is apparent that while the several nipple members 214 may move as a unit with the nipple carrying bar 42' into contact with the work, each nipple may also individually move relative to the bracket 210 against the resistance of spring 218 to meet the requirements of the work portion immediately below the nipple and apply the requisite holding pressure thereto.

From the foregoing description and accompanying drawings, it will be seen that I have devised a stitching mechanism of the multiple needle type in which the usual thread carrying needles for cooperation with the hook needles 20 and 22, have been replaced by a very simple and reliably functioning means mounted beneath the bed plate of the machine, operating in proper sequential relation to the reciprocating movements of the hook needles to carry the respective threads between successive points of penetration of the fabric by said needles in diagonally intersecting relation to each other, with the positive engagement of the threads in the respective needle hooks in the stitch forming operation thereof. Thus the fabric may be provided with continuous superimposed zig-zag lines of stitching with the points of intersection of the threads accurately located in equidistantly spaced apart relation, or by variation in the feed of the fabric and proper timing of the sequential operation of the needles and the thread carrying means, other arrangements of the crossed or intersecting threads may be provided to produce a variety of ornamental stitch designs.

Optionally, the saddle stitch may be employed to lock the diagonally intersecting threads to the fabric, thereby modifying the design and increasing the attractive appearance thereof. This is particularly true when the intersecting threads and the saddle thread are of different, selected colors.

It will further be noted that the novel results of my present invention are accomplished by a comparatively simple and space conserving mounting and arrangement of the several mechanical units, the various elements of which are of rugged construction and arranged in cooperative relation to reliably and efficiently function at high speeds. It will further be appreciated that a machine embodying a thread carrying unit of either the single or multiple type above described, may be economically produced. Operating or maintenance expense of such a machine will also be reasonably low.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In stitching mechanism of the multiple needle type, having two hook needles mounted above the machine bed for vertical reciprocation in transversely spaced apart relation to the line of feed of the work to form parallel lines of stitching in the work; thread carrying elements mounted below the machine bed for movement relative to each other and the needles to carry the respective threads from stitches previously formed by the respective needles in the work and position said threads in diagonally intersecting relation to each other for engagement in the hooks of the respective needles in the following stitch forming operation thereof, and means for actuating said thread carrying elements in timed relation with the reciprocation of said hook needles.

2. Multiple needle stitching mechanism as defined in claim 1, wherein said actuating means includes means for concurrently transmitting transverse and longitudinal movement to said thread carrying elements with respect to the line of feed of the work to cause the threads to partially encircle the respective needle shanks in contact therewith.

3. Multiple needle stitching mechanism as defined in claim 1, wherein said thread carrying elements comprise a pair of fingers mounted at one of their ends beneath the machine bed in advance of said hook needles with the other thread carrying ends thereof adjacent to the zone of reciprocation of said needles, and in which said actuating means includes means for moving said fingers in relatively opposite directions transversely of the line of feed to alternately carry the threads to the respective hook needles in successive stitch forming operations thereof.

4. Multiple needle stitching mechanism as defined in claim 3, in which said thread carrying fingers are disposed in superposed relation to each other and pivotally mounted beneath the machine bed.

5. In stitching mechanism having a pair of vertically reciprocating hook needles mounted above the machine bed and transversely spaced apart with respect to the line of feed of the work; means mounted below the bed plate for supplying individual threads to said needles and for diagonally crossing the threads on one side of the work between successive stitches formed therein by said needles, said means comprising a pair of thread carrying fingers and means mounting said fingers for unitary rocking movement in a vertically arcuate path with respect to the needles and for individual relative movement in opposite directions transversely thereof in the working zone of the needles, and means for simultaneously imparting such rocking and individual transverse movements to the thread carrying fingers in timed relation with the reciprocation of the needles to carry the threads in diagonally crossed relation from previously formed stitches into contact with the resepctive needles and move the threads longitudinally thereof into the respective needle hooks.

6. Stitching mechanism as defined in claim 5, wherein said last named means comprises a power driven shaft mounted beneath the bed plate of the machine, and motion transmitting connections between said shaft and the thread carrying fingers including means to move said fingers in said arcuate path in timed relation with their relative transverse movement.

7. Stitching mechanism as defined in claim 5, wherein said mounting means for the thread carrying fingers comprises a gear housing oscillatable about an axis disposed transversely of the line of feed, and said last named means includes means for oscillating said housing, and gearing in said housing operatively connected with said fingers.

8. Stitching mechanism as defined in claim 7, together with latch means releasably connecting said housing with the oscillating means therefor to permit independent rocking movement of the housing about said axis in one direction to position said fingers relative to the machine bed, for the connection of the threads therewith.

9. Stitching mechanism as defined in claim 7, in which said housing oscillating means comprises a power driven shaft mounted beneath the bed plate of the machine, together with a control cam drivingly connected to said shaft and means operatively connecting said cam with said gearing, said cam having means to reversibly control the actuation of said gearing.

10. Stitching mechanism as defined in claim 9, and work feeding mechanism actuated by said power driven shaft in timed relation with the operation of said thread carrying fingers and the reciprocation of said needles.

11. Multiple needle stitching mechanism as defined in claim 1, wherein an additional hook needle reciprocates vertically in advance of the intersecting point of said diagonally crossed thread portions, and a thread carrying needle is mounted to reciprocate in timed relation with said hook needle in a vertically oblique path rearwardly of said intersecting point of said diagonally crossed thread portions.

12. Multiple needle stitching mechanism as defined in claim 11, said path of reciprocation of the thread carrying needle being inclined longitudinally and transversely of the line of feed of the work.

13. In stitching mechanism having a pair of vertically reciprocating hook needles mounted above the machine bed, and transversely spaced apart with respect to the line of feed of the work and a main operating shaft for said needles; a four-motion work feeding dog mounted below the machine bed, means operable in each feeding movement of the work to carry the individual threads from perforations last formed in the work by the respective needles to a diagonally opposite needle and position the same for engagement in the needle hooks in the following stitch forming operation thereof, means for actuating said thread carrying means, a shaft journalled beneath the machine bed and driven from said main operating shaft, and means operatively connecting the latter shaft with said actuating means and said work feeding dog to operate the thread carrying means and feed dog in timed relation with the reciprocation of said needles.

14. Stitching mechanism as defined in claim 13, wherein the thread carrying means is mounted in advance of the needles, together with additional means operable upon engagement of the threads with the respective needles to transmit a vertical movement component to the thread carrying means and shift the threads longitudinally along the needles into positive engagement with the hooks thereof.

15. Stitching mechanism as defined in claim 13, wherein said actuating means includes independently rotatable coaxial shafts and said thread carrying means comprises a pair of fingers movable in parallel planes relative to each other and fixed to the respective shafts.

16. In stitching mechanism of the multiple needle type, a pair of stitch forming needles in spaced transversely aligned relation to the line of intermittent feed of the work and a third stitch forming needle spaced rearwardly from said pair of needles, means for vertically reciprocating said stitch forming needles as a unit, means operable during each feeding movement of the work to diagonally cross the threads from transversely spaced stitches formed in the work by said pair of needles and position said threads for engagement by the respective needles thereof in their following stitch forming operation, said third needle moving between the threads adjacent one side of their point of intersection, means for actuating said last named means in timed relation with the reciprocation of said needles, an additional obliquely inclined thread carrying needle mounted to reciprocate in cooperating relation with said third stitch forming needle and movable between the diagonally crossed threads at the opposite side of their point of intersection to form a saddle stitch overlying the diagonally crossed threads, and means for actuating said thread carrying needle in timed relation with said stitch forming needles.

17. In multiple needle stitching mechanism, a pair of vertically reciprocating hook needles spaced apart transversely of the line of feed of the work to form parallel stitch chains on one side of the work, means for intermittently feeding the work, means for supplying individual threads to said needles comprising thread carrying members movable relative to each other and the needles in each feeding movement of the work between successive needle perforations in the work to diagonally cross the threads between said perforations and position the same for engagement in the needle hooks to form continuous superimposed zig-zag lines of stitching on the opposite side of the work, having diagonally intersecting thread strands between adjacent needle perforations, and means for actuating said needles and thread carrying members in timed relation with each other.

18. In stitching mechanism having a plurality of vertically reciprocating hook needles mounted above the machine bed in transversely spaced apart pairs with respect to the line of feed of the work, thread supply means mounted below the machine bed comprising a pair of thread carrying members associated with each pair of hook needles and arranged for reciprocation transversely of the line of feed, means for reciprocating said members of each pair in reverse directions relative to each other to carry individual threads in diagonally intersecting relation to each other between needle perforations successively formed in the work by the respective pairs of needles and position said threads for engagement in the hooks of the respective needles in the stitch forming operation thereof, means for intermittently feeding the work, and means controlling the reciprocation of said thread carrying members and operation of said work feeding means in timed relation with each other and the reciprocation of the hook needles.

19. Stitching mechanism as defined in claim 18, wherein said thread carrying members and the means for reciprocating said members comprise a unitary assembly mounted in advance of the hook needles for rocking movement about an axis transverse to the line of feed, together with means for rocking said assembly to move said members through an arcuate path in the direction of feed to carry the threads partially around the needles and downwardly into the respective needle hooks.

VICTOR J. SIGODA.

REFERENCES CITED

The following references are of record in the file of this patent:

UNITED STATES PATENTS

| Number | Name | Date |
|---|---|---|
| 1,095,199 | Fink | May 5, 1914 |
| 2,369,183 | Sigoda | Feb. 13, 1945 |

FOREIGN PATENTS

| Number | Country | Date |
|---|---|---|
| 3,812 | Great Britain | 1893 |
| 21,099 | Great Britain | 1905 |